United States Patent
Igeta

(10) Patent No.: US 7,620,906 B2
(45) Date of Patent: Nov. 17, 2009

(54) DISPLAY APPARATUS AND METHOD FOR DISPLAYING SCREEN WHERE DRAGGING AND DROPPING OF OBJECT CAN BE EXECUTED AND PROGRAM STORED IN COMPUTER-READABLE STORAGE MEDIUM

(75) Inventor: Satoshi Igeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 11/211,044

(22) Filed: Aug. 24, 2005

(65) Prior Publication Data

US 2006/0048069 A1 Mar. 2, 2006

(30) Foreign Application Priority Data

Sep. 2, 2004 (JP) ............................. 2004-256112
Jul. 12, 2005 (JP) ............................. 2005-203467

(51) Int. Cl.
*G06F 3/00* (2006.01)
*G06F 3/048* (2006.01)

(52) U.S. Cl. ..................... 715/769; 715/759; 715/794

(58) Field of Classification Search ............. 715/759, 715/765, 769, 794, 709, 710, 808, 821, 822
See application file for complete search history.

(56) References Cited

U.S. PATENT DOCUMENTS 5,392,389 A * 2/1995 Fleming .................... 715/769
6,057,844 A * 5/2000 Strauss ...................... 715/863
6,191,807 B1 * 2/2001 Hamada et al. ............. 715/769
6,593,938 B1 * 7/2003 Sakata et al. ............... 345/629
6,807,668 B2 * 10/2004 Stern et al. ................. 715/769
2005/0166159 A1 * 7/2005 Mondry et al. ............. 715/769

* cited by examiner

*Primary Examiner*—Weilun Lo
*Assistant Examiner*—Truc T Chuong
(74) *Attorney, Agent, or Firm*—Canon U.S.A. Inc., I.P. Division

(57) ABSTRACT

In the present invention, a user allows a computer to execute application software to display an object on a display and to move the object by dragging and dropping it using a pointing device, thus providing instructions of insertion or replacement of the displayed object. When the user drags and drops an object on a screen displayed on the display in accordance with the application software, an area corresponding to a position where the object is dragged or dropped is emphasized. Accordingly, the user can easily see a position where the object is dragged and dropped. When the type of process to be performed on the object varies in accordance with the position where the object is dropped, the area is emphasized with an emphasis pattern corresponding to a process to be executed. Accordingly, the user can easily determine a position where the object is dragged or dropped.

4 Claims, 12 Drawing Sheets

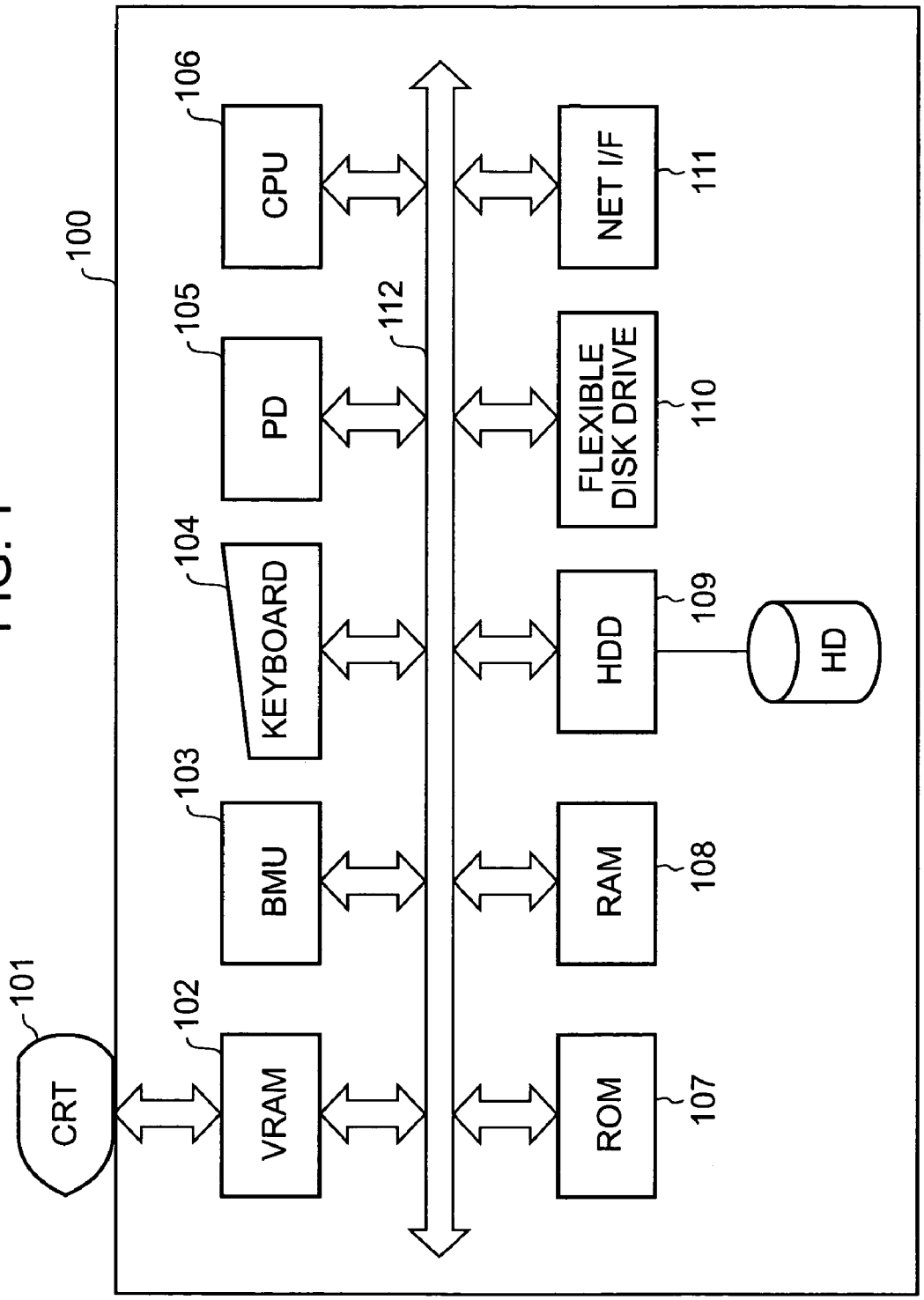

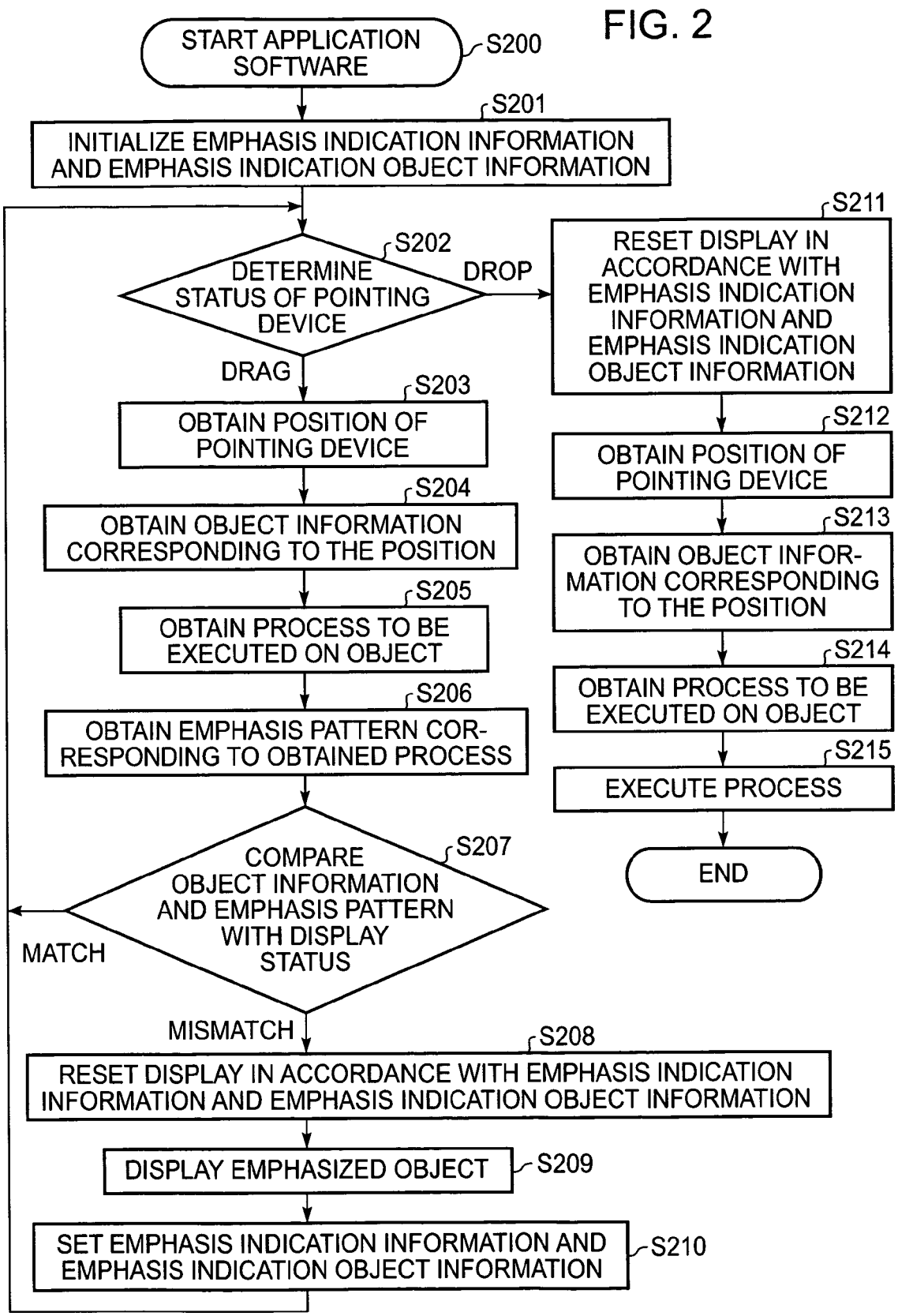

INDICATE INSERTION TARGET WITH BLUE FRAME

DISPLAY APPARATUS AND METHOD FOR DISPLAYING SCREEN WHERE DRAGGING AND DROPPING OF OBJECT CAN BE EXECUTED AND PROGRAM STORED IN COMPUTER-READABLE STORAGE MEDIUM

BACKGROUND OF THE INVENTION

1. Field of the Invention

The present invention relates to a program product or a computer apparatus for allowing the computer apparatus to execute a process on an object by displaying the object on a display and by dragging and dropping the object in response to a pointing device operation performed by a user.

2. Description of the Related Art

Hitherto, a user allows a computer to execute application software so as to display an object on a display. The user provides instructions of executing a process, such as insertion, duplication, move, replacement, or interchange of the displayed object by moving the object by dragging and dropping it with a pointing device.

Under these circumstances, the following problems arise. When the user drags and drops an object on a screen displayed on a display in accordance with the application software, he/she cannot easily determine a position to which the object is dragged or dropped.

Also, when the type of process to be executed on the object varies depending on a position where the object is dropped and when the user cannot easily determine a position to which the object is dragged or dropped, a process contrary to a user's expectation or intention is executed after the user drops the object.

SUMMARY OF THE INVENTION

The present invention is directed to enable a user to easily determine a position where an object is dragged or dropped when the user drags and drops the object on a screen displayed in accordance with application software.

Also, the present invention is directed to enable a user to easily determine the type of process to be executed on an object based on a position where the object is dropped when the user drags and drops the object on a screen displayed in accordance with application software.

In accordance with an aspect of the present invention, a display apparatus for displaying a screen where dragging and dropping of an object can be executed is provided. The display apparatus includes: a drag detecting unit adapted to detect a position where the object is dragged; a selection unit adapted to select a type of process to be executed if the object is dropped at the position detected by the drag detecting unit; an emphasis pattern determination unit adapted to determine an emphasis pattern corresponding to the type of process selected by the selection unit; and an area display control unit adapted to control display so that an emphasized area in the screen is displayed in accordance with the emphasis pattern determined by the emphasis pattern determination unit.

In accordance with another aspect of the present invention, a screen display method for displaying a screen where dragging and dropping of an object can be executed is provided. The screen display method includes: a drag detecting step of detecting a position where the object is dragged; a selection step of selecting a type of process to be executed if the object is dropped at the position detected in the drag detecting step; an emphasis pattern determination step of determining an emphasis pattern corresponding to the type of process selected in the selection step; and an area display control step of controlling display so that an emphasized area in the screen is displayed in accordance with the emphasis pattern determined in the emphasis pattern determination step.

In accordance with another aspect of the present invention, a computer-readable program embodied in a computer readable medium causes a computer to execute the screen display method described above.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of a configuration of a computer apparatus according to an embodiment of the present invention.

FIG. 2 is a flowchart showing an example of a procedure of a process executed by the computer apparatus in accordance with application software.

DESCRIPTION OF THE EMBODIMENTS

Figure 3A:
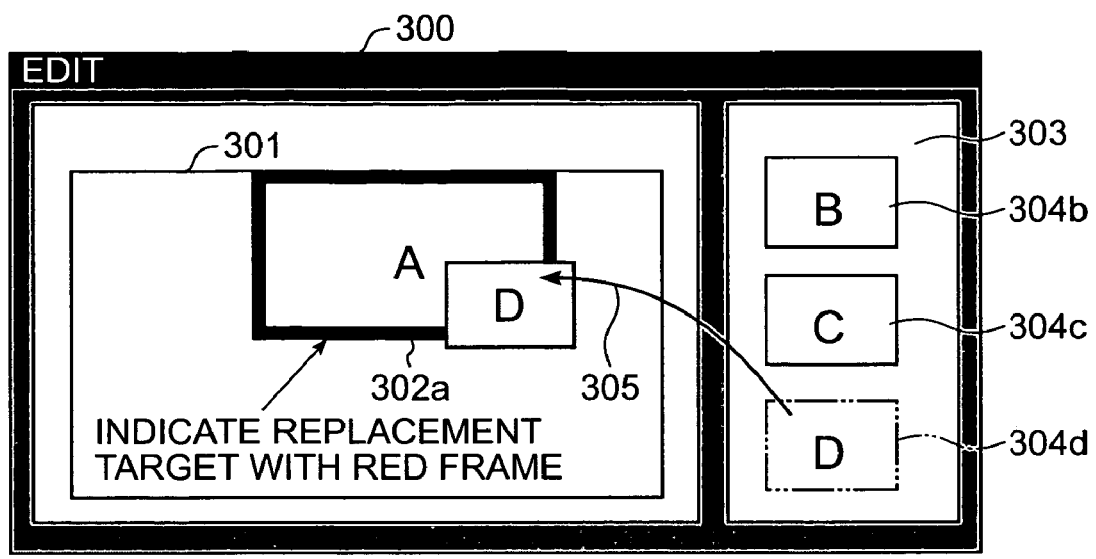
FIGS. 3A and 3B show examples of an edit screen displayed on a display of the computer apparatus.

Hereinafter, embodiments of the present invention are described in detail with reference to the attached drawings.

First Embodiment

FIG. 1 is a block diagram showing an exemplary configuration of an information processing apparatus (computer apparatus 100) executing processes in accordance with application software (program) according to an embodiment of the present invention.

In FIG. 1, a cathode ray tube (CRT) 101 serves as a display device. For example, documents, figures, and images under editing, other edit information, icons, messages, menus, and other user interface information are displayed on a display of the CRT 101.

Images to be displayed on the display of the CRT 101 are rendered in a video RAM (VRAM) 102. The image data generated in the VRAM 102 is transferred to the CRT 101 in accordance with a predetermined rule, so that images are displayed on the CRT 101.

A bit move unit (BMU) 103 controls data transfer between memories (e.g., between the VRAM 102 and another memory) and data transfer between a memory and each input/output (I/O) device (e.g., a network interface (I/F) 111).

A keyboard 104 has various keys for inputting document data and so on.

A pointing device (PD) 105 is used to point to an icon, a menu, an image, an illustration, or another object displayed on the display of the CRT 101. Although not shown, the keyboard 104 connects to the pointing device 105 via an input device interface.

A central processing unit (CPU) 106 controls each device connected to the CPU based on a control program stored in a read only memory (ROM) 107, a hard disk, or a flexible disk.

The ROM 107 holds various control programs and data. A random access memory (RAM) 108 has a work area for the CPU 106, a data save area in case of error processing, and a control program loading area.

A hard disk drive (HDD) 109 controls access to a hard disk (HD), which can store an operating system (OS) and control programs executed in the information processing computer apparatus 100. The HD also stores data and files of content, such as images. For example, the hard disk in the computer apparatus 100 stores object data of this embodiment including image data, text data and application software according to this embodiment.

A flexible disk drive 110 controls access to a flexible disk.

The network interface 111 is capable of communicating with external apparatuses, such as another information processing computer apparatus and a printer.

A CPU bus 112 includes an address bus, a data bus, and a control bus and allows the various components to communicate with each other. The control program can be provided to the CPU 106 from the ROM 107, the hard disk, or the flexible disk. Alternatively, the control program can be provided from another information processing apparatus or the like via the network interface 111.

The application software according to this embodiment is a program executed by the above-described information processing computer apparatus 100. This application software can deal with various objects including illustrations, icons, and data or files of still/moving images and thumbnails thereof.

FIG. 2 is a flowchart showing a procedure of a process executed by the CPU 106 of the computer apparatus 100 in accordance with the configuration of the application software of this embodiment.

Referring to FIG. 2, the CPU 106 of the computer apparatus 100 starts the application software in step S200 so as to allow the CRT 101 to display an edit screen. A description is provided below of a process executed by the CPU 106 based on the application software after dragging of an object (data or a file of a still or moving image) started in an editing operation by a user.

In step S201, the CPU 106 initializes emphasis indication information and emphasis indication object information and stores the emphasis indication information and emphasis indication object information in the RAM 108. The emphasis indication object information indicates which object on the edit screen is emphasized. The emphasis indication information indicates how the object is emphasized: for example, a frame of the object is displayed in red with a width of five dots. Herein, the emphasis indication information and the emphasis indication object information are initialized because no object is emphasized on the edit screen at startup.

Although not shown, the RAM 108 stores object information, such as state information indicating a shape (e.g., rectangular or circular) of each object and area information indicating coordinates of a display position of each object. Also, the RAM 108 stores correspondence information (scroll position information, display magnification, etc.) between image data displayed on the CRT 101 and the area information of each object. That is, the RAM 108 stores a state of a screen that is being displayed on the CRT 101.

In step S202, the CPU 106 determines whether an object is being dragged or dropped on the edit screen and detects the dragged or dropped object. Although not shown, if the object is neither being dragged or dropped, step S202 is repeated until an object is being dragged or dropped, i.e., the process is in a wait state at step S202 until a drag or drop operation is preformed. Dragging of an object is performed by a user by pushing a button on the pointing device 105 on the edit screen to select an object and by moving the object while keeping the button pushed. When the user releases the button on the pointing device 105 after dragging, the object is dropped. That is, the CPU 106 obtains a status of the pointing device 105 so as to detect a dragged and dropped object and to determine whether the operated object is being dragged or has been dragged (being dropped). If the object is being dragged, the process proceeds to step S203, whereas if the object has been dragged and dropped, the process proceeds to step S211.

In step S203, the CPU 106 obtains position information of the pointing device 105.

In step S204, the CPU 106 obtains, from the RAM 108, object information corresponding to the position of the pointing device 105 obtained in step S203. As described above, the object information stored in the RAM 108 includes object state information, object area information, and correspondence information between image data displayed on the CRT 101 and the object area information. The CPU 106 determines and obtains object information corresponding to the position of the pointing device 105 based on the object area information included in the object information.

In step S205, the CPU 106 selects and obtains a process that will be executed after the operated object is dropped at the position based on the position of the pointing device 105 obtained in step S203 and the object information obtained in step S204.

For example, as shown in FIG. 3A (described later), if the pointing device 105 is in an edit area 301 and if object information already exists at that position, the CPU 106 determines that an object 302a that exists in the edit screen should be replaced by an operated object 304d.

Figure 4A:
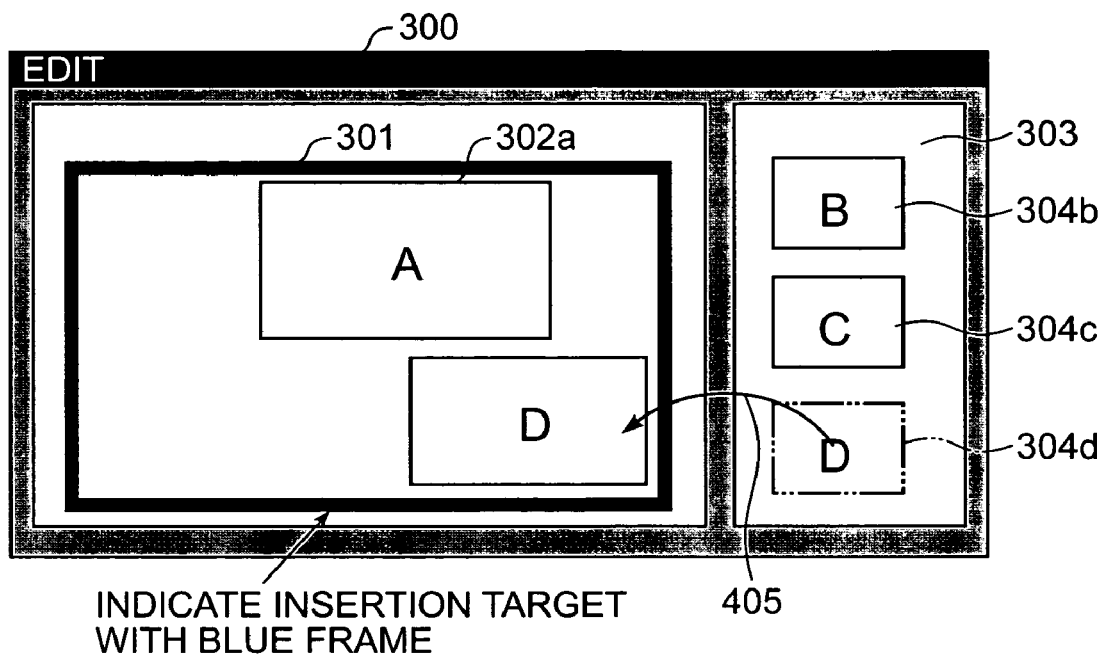
FIGS. 4A and 4B show examples of the edit screen displayed on the display of the computer apparatus.

On the other hand, as shown in FIG. 4A (also described later), if the pointing device 105 is in the edit area 301 and if no object information exists at that position, the CPU 106 determines that the operated object 304d should be inserted into the edit area 301.

When a process is selected and obtained in step S205, the state of the operated object and a key pushed during dragging can be taken into consideration. Herein, replacement and insertion are used as examples of a process executed by the application software of this embodiment. However, duplication, move, interchange, creation of a shortcut, and so on, can also be executed depending on the type of the application software.

After step S205, the process proceeds to step S206 where the CPU 106 selects and obtains an emphasis pattern corresponding to the process obtained in step S205. In exemplary embodiments, emphasis patterns are stored in a table and are associated with types of processes.

Emphasis patterns are described next. Note that, in FIGS. 3A to 4B, a window edit screen 300 of the application software according to this embodiment is provided with an edit area 301 and an object selecting area 303. Before an operated object is dragged, an object 302a is displayed in the edit area 301 and three objects 304b, 304c, and 304d are displayed in the object selecting area 303.

For example, when a display pattern of replacement is associated with displaying a frame of the object in red, an emphasis pattern of displaying the frame of the object 302a at the position indicated by the pointing device 105 in the edit area 301 in red is obtained and displayed, as shown in FIG. 3A. In other words, as indicated by an arrow 305 in FIG. 3A, when the user drags the operated object 304d from the object selecting area 303 onto the object 302a in the edit area 301, the object 302a at the position indicated by the pointing device 105 is emphasized by a red frame. Accordingly, at the position indicated by the pointing device 105, it can be clearly seen that the object 302a is a target where the object 304d is to be dropped and that replacement will be performed after the object 304d is dropped at that position.

On the other hand, when a display pattern of insertion is associated with displaying a frame of the edit area in blue, an emphasis pattern of displaying the frame of the edit area 301 in blue is obtained and displayed, as shown in FIG. 4A. In other words, as indicated by an arrow 405 in FIG. 4A, when the user drags the object 304d from the object selecting area 303 into the edit area 301, the edit area 301 is emphasized by a blue frame. Accordingly, at the position indicated by the pointing device 105, it can be clearly seen that the edit area 301 is a target where the object 304d is to be dropped and that insertion will be performed after the object 304d is dropped at that position.

Referring back to FIG. 2, the process proceeds to step S207 where the CPU 106 compares the object information obtained in step S204 and the emphasis pattern obtained in step S206 with a display status stored in the RAM 108, such as the emphasis indication object information and the emphasis indication information. If both match with each other, the process returns to step S202, so that a next dragging can be performed. If both do not match with each other, the process proceeds to step S208. The display status stored in the RAM 108 is the emphasis indication information and the emphasis indication object information that were stored and initialized in step S201. Therefore, if that information is in an initialized state, a determination of mismatch is made in step S207.

In step S208, the CPU 106 creates image data of an object in which emphasizing is reset in the VRAM 102 based on the emphasis pattern indicated by the emphasis indication information of the display status stored in the RAM 108, and displays the created image data on the display of the CRT 101. As in step S207, if the emphasis indication information and the emphasis indication object information of the display status are initialized, the image data is not updated.

In step S209, the CPU 106 creates image data of an emphasized object in the VRAM 102 in accordance with the object information obtained in step S204 and the emphasis pattern obtained in step S206, and displays the created image data on the display of the CRT 101.

In step S210, the CPU 106 stores the emphasis indication information indicating the emphasis pattern used in step S209 as a display status in the RAM 108.

The above-described steps are executed while the operated object is being dragged. With these steps, the object is displayed on the display window while the emphasis pattern is changed in accordance with a position indicated by the pointing device.

A process executed after the operated object has been dragged and dropped is described next with reference to the flowchart shown in FIG. 2.

As described above, the CPU 106 obtains a status of the pointing device 105 in step S202 in order to determine whether the operated object is being dragged or has been dragged (being dropped). If it is determined that the object has been dragged and dropped, the process proceeds to step S211.

In step S211, the CPU 106 creates image data that is not emphasized in the VRAM 102 based on the display status of the object in which the emphasis pattern indicated by the emphasis indication information stored in the RAM 108 is reset, and displays the created image data on the display of the CRT 101. As in step S208, the image data is not updated if the emphasis indication information and the emphasis indication object information of the display status are initialized. Further, a memory area of the emphasis indication information and the emphasis indication object information obtained in the RAM 108 in step S201 is freed.

In step S212, the CPU 106 obtains position information indicating a position pointed by the pointing device 105.

In step S213, the CPU 106 obtains, from the RAM 108, object information corresponding to the position indicated by the pointing device 105 obtained in step S212.

In step S214, as in step S205, the CPU 106 selects and obtains a process to be executed after the operated object has been dropped based on the position indicated by the pointing device obtained in step S212 and the object information obtained in step S213.

Figure 3B:
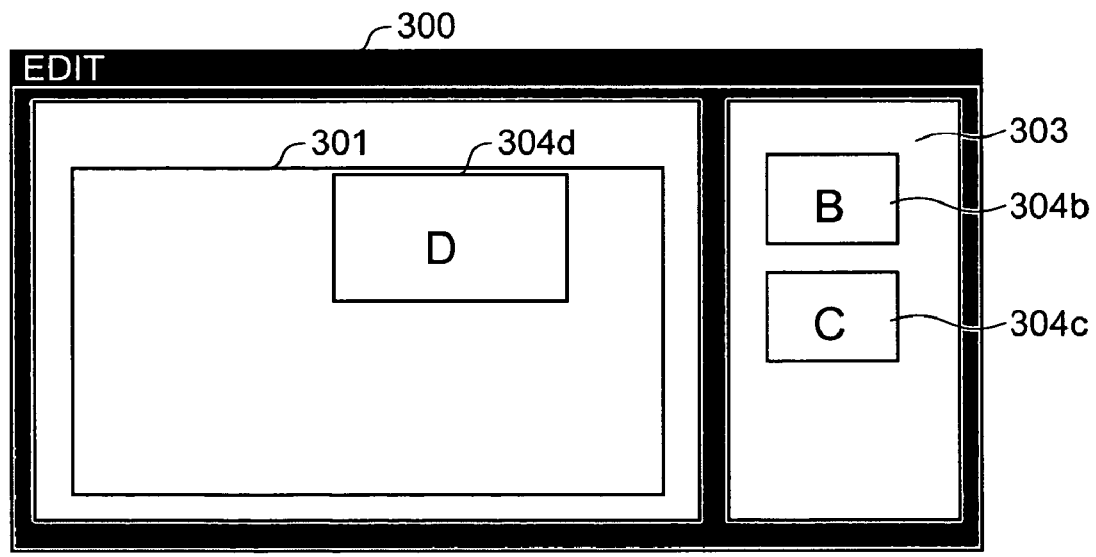
Figure 4B:
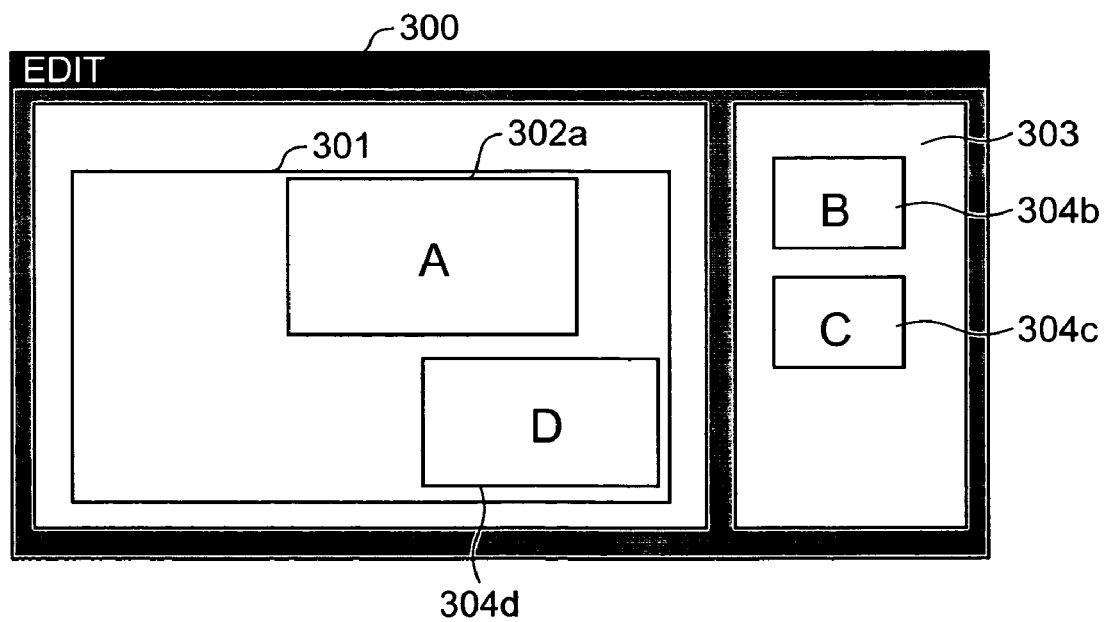

In step S215, the CPU 106 executes a process on the dropped object in accordance with the process obtained in step S214. For example, when replacement of the object 304d is executed, the object 304d is displayed at the position where the object 302a was displayed in the edit area 301, as shown in FIG. 3B. When insertion of the object 304b is executed, the object 304d is moved from the object selecting area 303 to the edit area 301, as shown in FIG. 4B. In this way, various types of processes can be executed in conjunction with the emphasizing performed during dragging.

Figure 5A:
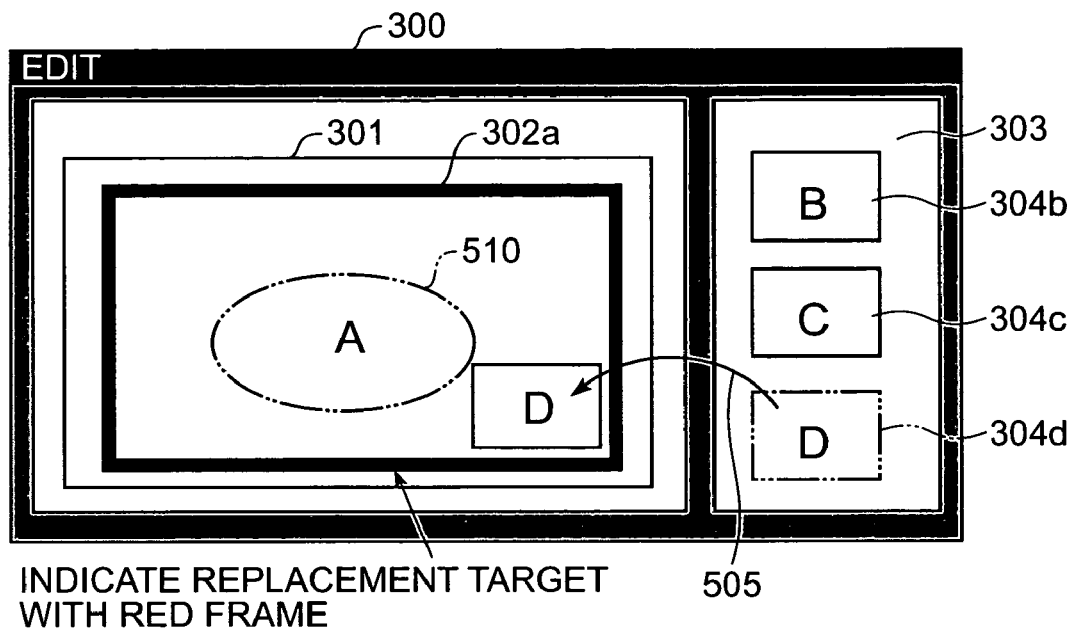
FIGS. 5A and 5B show examples of the edit screen displayed on the display of the computer apparatus.
Figure 5B:
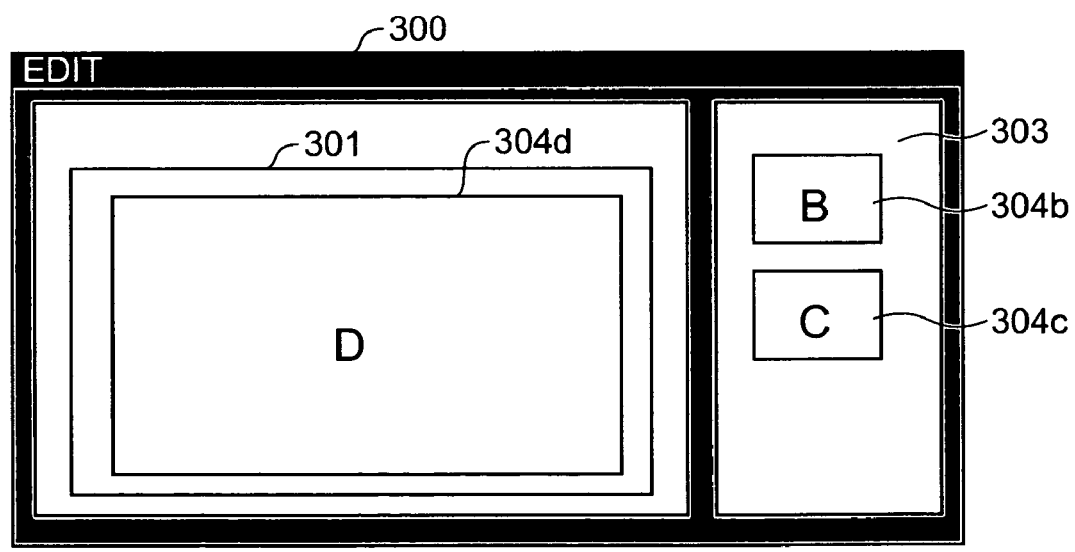
Figure 6A:
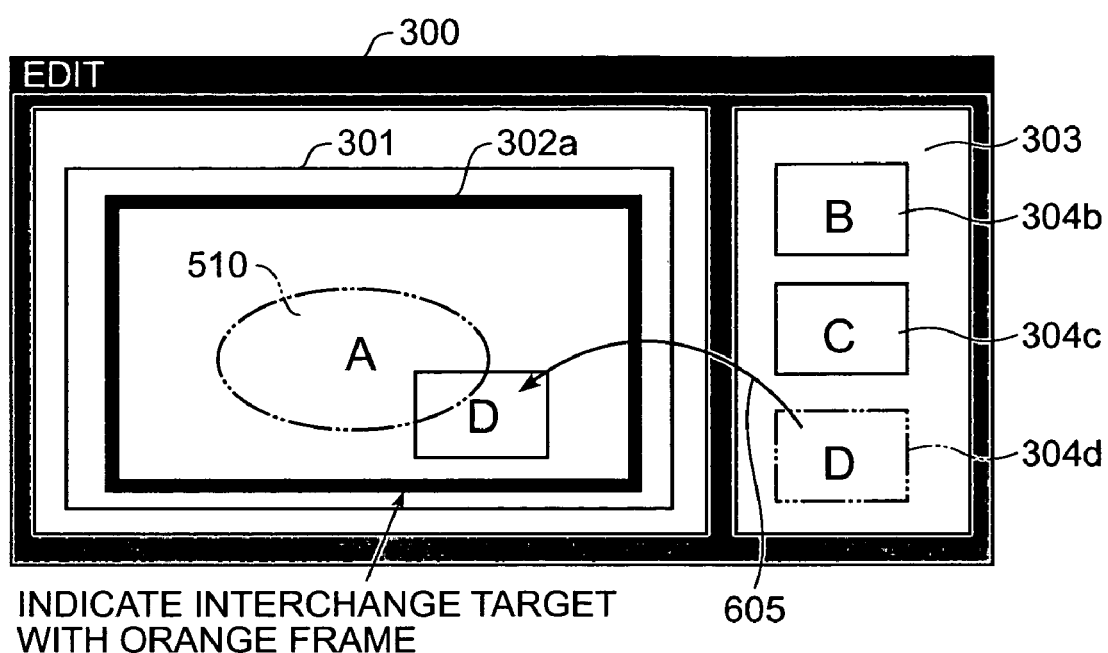
FIGS. 6A and 6B show examples of the edit screen displayed on the display of the computer apparatus.
Figure 6B:
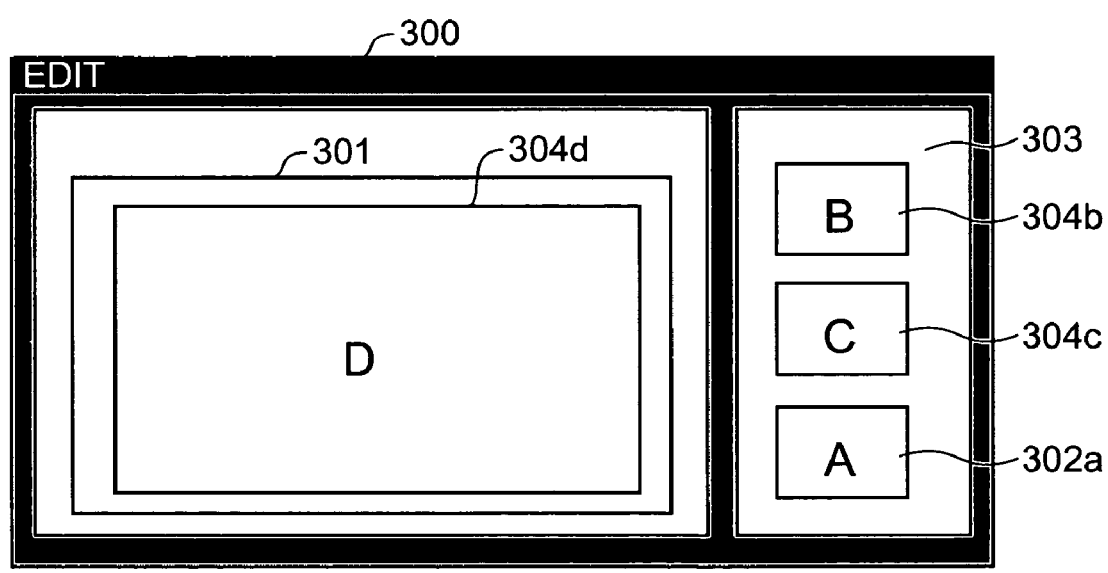

In the above-described embodiment, one process is executed in response to dragging or dropping on an object existing on the edit screen. However, a plurality of processes may be executed. For example, two or more processes can be realized at the same time: replacement is executed when the operated object is dropped outside a predetermined range of the existing object; and interchange is executed when the operated object is dropped inside the predetermined range. In this case, as shown in FIG. 5A, the object 304d is dragged onto the object 302a that is displayed in the edit area 301. Then, when the pointer of the pointing device 105 enters the area of the object 302a outside a predetermined range 510, the object 302a as a target of dropping is emphasized with a red frame so that it is clearly seen that replacement will be executed. If the user continues to drag the object 304d until the pointer of the pointing device 105 enters the predetermined range 510 of the object 302a, as shown in FIG. 6A, the emphasizing red frame of the object 302a changes to an orange frame so that it is clearly seen that the process has changed from replacement to interchange. If the object 304d is dropped when the pointer of the pointing device 105 enters the area of the object 302a outside the predetermined range 510, the object 302a is replaced by the object 304d, so that the object 302a disappears and the object 304d is displayed in the edit area 301, as shown in FIG. 5B. If the object 304*d* is dropped when the pointer of the pointing device 105 enters the predetermined range 510 of the object 302*a*, the object 304*d* is displayed in the edit area 301 and the object 302*a* is displayed in the object selecting area 303, as shown in FIG. 6B. In the above-described manner, a process that can be executed by an action on an object can be selected from among a plurality of processes. In this case, the range of the object corresponding to each process may be defined by a predetermined shape or area, or may be defined by a predetermined ratio to the area of the displayed image.

In the above-described embodiment, a change in color is adopted as emphasis patterns indicating the respective types of process. However, the present invention is not limited to the change in color. For example, emphasizing may be expressed by changing a width of a frame, a degree of emphasizing, an interval of blinking, a method of inverted display, or a degree of transparency, or by using a double line or a wavy line as a frame to be emphasized.

Among the functions of the application software according to the above-described embodiment, functions that are not related to emphasizing of an object are the same as in general application software.

According to this embodiment having the above-described configuration, since an emphasized area varies in accordance with the position of an object indicated by the pointing device, the user can clearly see the position where the operated object is dragged and dropped.

Also, according to this embodiment, when a process to be executed on an object varies depending on a position where the object is dropped, an emphasis pattern is varied in accordance with the type of process, for example, by changing a color or by blinking an area. With this method, the user can clearly determine an object or an edit area to which an operated object is to be dropped and a process to be executed after dropping, so that the user can easily and clearly determine a process to be executed after the operated object is dropped.

Therefore, even when a plurality of objects exist at a position where an operated object is dragged or dropped, with the objects being adjacent to each other, or even when the operated object exists at a border between edit areas, the user can precisely determine a position where the object is dragged and dropped. Also, the user can know a process to be executed on the operated object after the object is dropped at the position indicated by the pointing device before dropping the operated object. Therefore, a process intended by the user can be reliably executed.

Further, an operation of dropping can be indicated to the user without changing a shape of a cursor to clearly indicate a position pointed by the pointing device in response to dragging and dropping of an object by a mouse. Therefore, the user can move an object to a desired position even in a precise moving operation requiring a precision of one dot, and thus the user need not be aware of a relationship between a shape of the cursor and a dropped position.

Second Embodiment

In a second embodiment, a display pattern in an edit screen varies in accordance with an overlapping area between a dragged operated object and an object already existing in the edit screen. In this embodiment, application software for creating an electronic album by using desired images is used as an example. In this case, thumbnail images are used as operated objects. Hereinafter, descriptions about parts common to the first embodiment are omitted and features of the second embodiment are described in detail.

Figure 7:
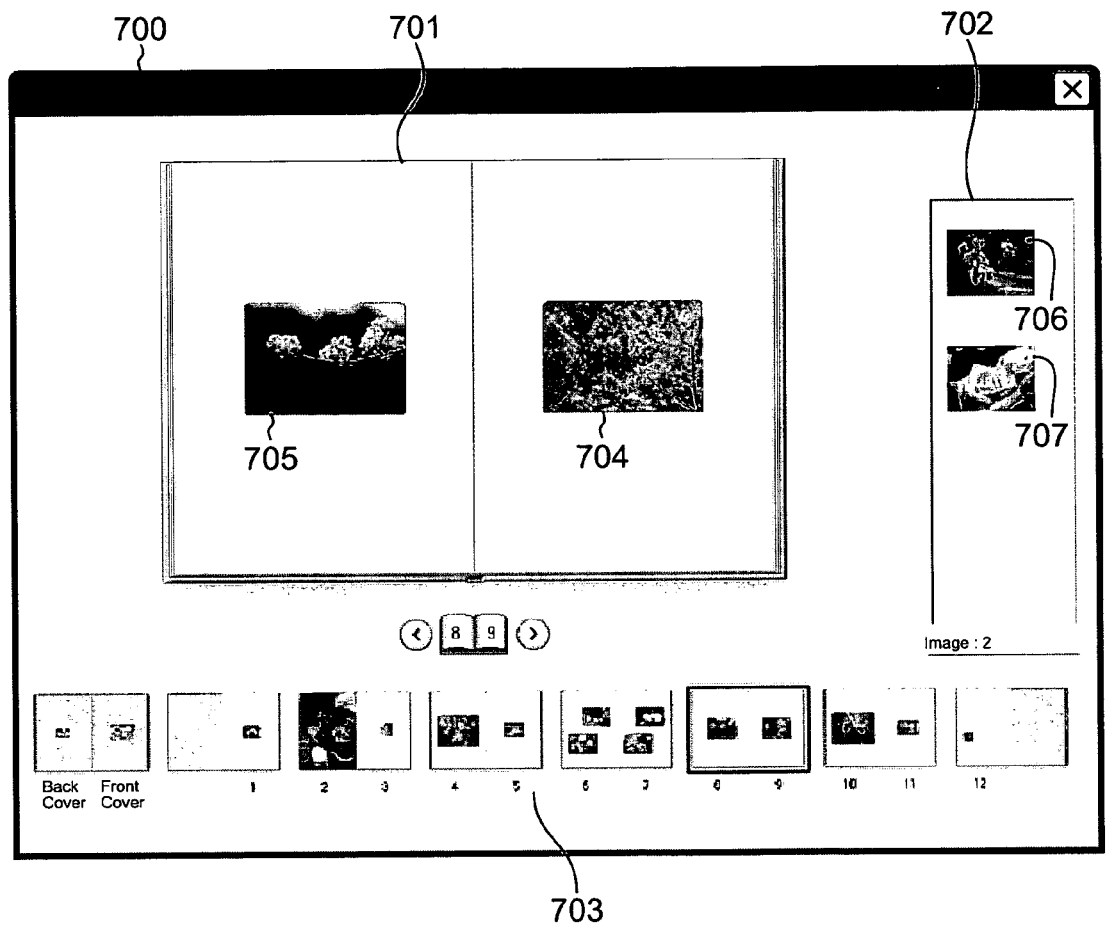
FIG. 7 shows an example of the edit screen displayed on the display of the computer apparatus.

First, an overview of an edit screen of this embodiment is described with reference to FIG. 7. As shown in FIG. 7, an edit area 701 of an electronic album, an object selecting area 702, and a page index area 703 showing an index of all pages of the electronic album are displayed on an edit screen 700. The edit area 701 displays a two-page spread of the electronic album. In the edit area 701, high-resolution images 704 and 705 are displayed on the two-page spread. Thumbnail images 706 and 707 are displayed in the object selecting area 702.

In this embodiment, when a user drags a thumbnail image in the object selecting area 702, an area of the edit screen is emphasized in accordance with an overlapping area between a high-resolution image in the edit area 701 and the thumbnail image. Then, when the user drops the thumbnail image in the object selecting area 702, a high-resolution image corresponding to the thumbnail image is displayed in an area of the edit screen in accordance with the overlapping area between the high-resolution image in the edit area 701 and the thumbnail image.

Figure 8:
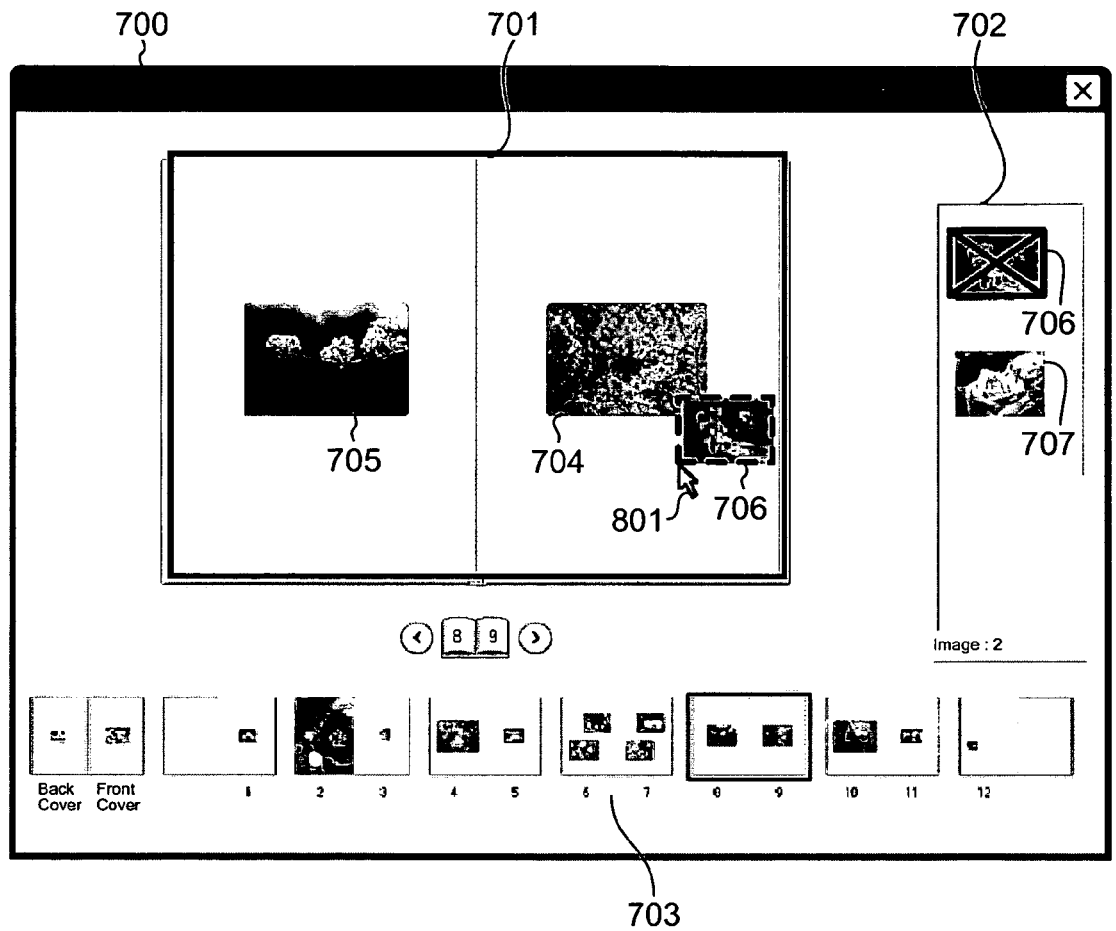
FIG. 8 shows an example of the edit screen displayed on the display of the computer apparatus.
Figure 9:
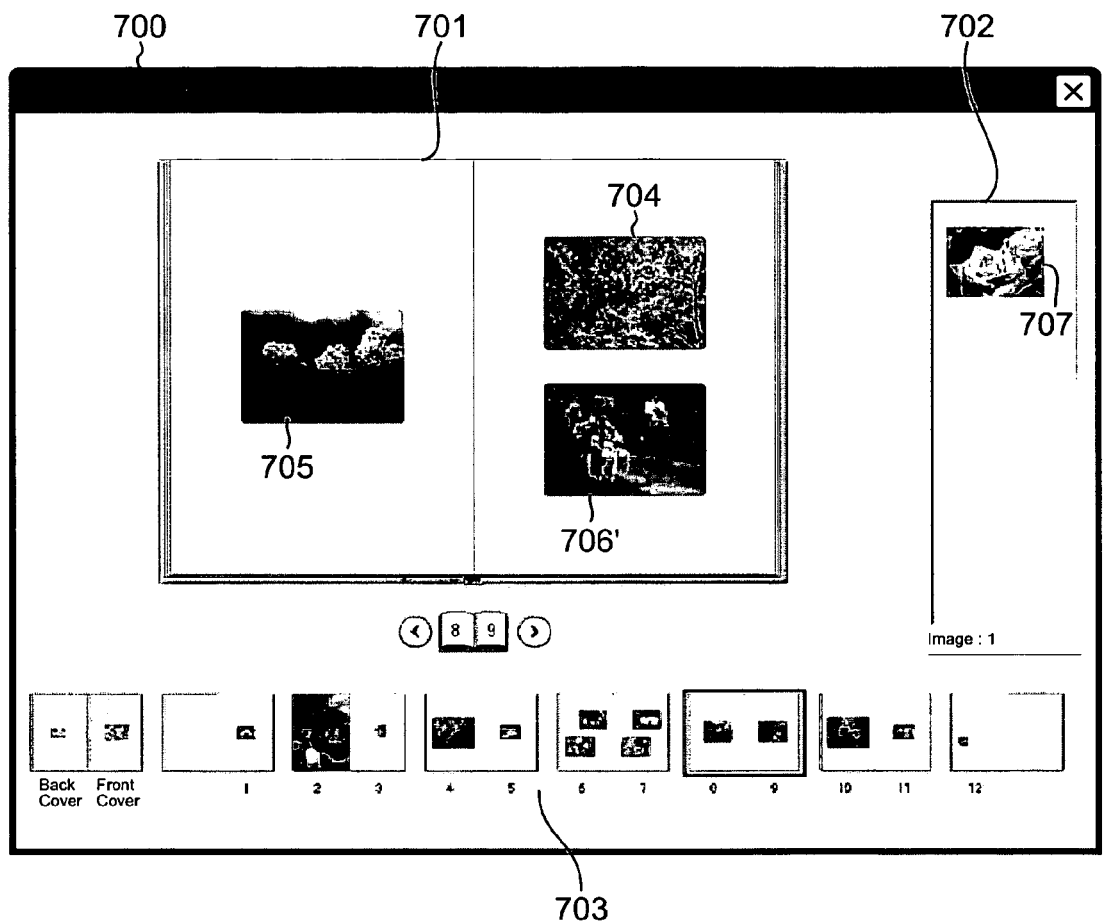
FIG. 9 shows an example of the edit screen displayed on the display of the computer apparatus.

More specifically, as shown in FIG. 8, when an overlapping area between the dragged thumbnail image 706 and the high-resolution image 704 in the edit area 701 is smaller than a predetermined value, the frame of the edit area 701 is emphasized. Then, when the thumbnail image 706 is dropped at this position, a high-resolution image 706' corresponding to the thumbnail image 706 is laid out and displayed in the edit area 701, as shown in FIG. 9.

Figure 10:
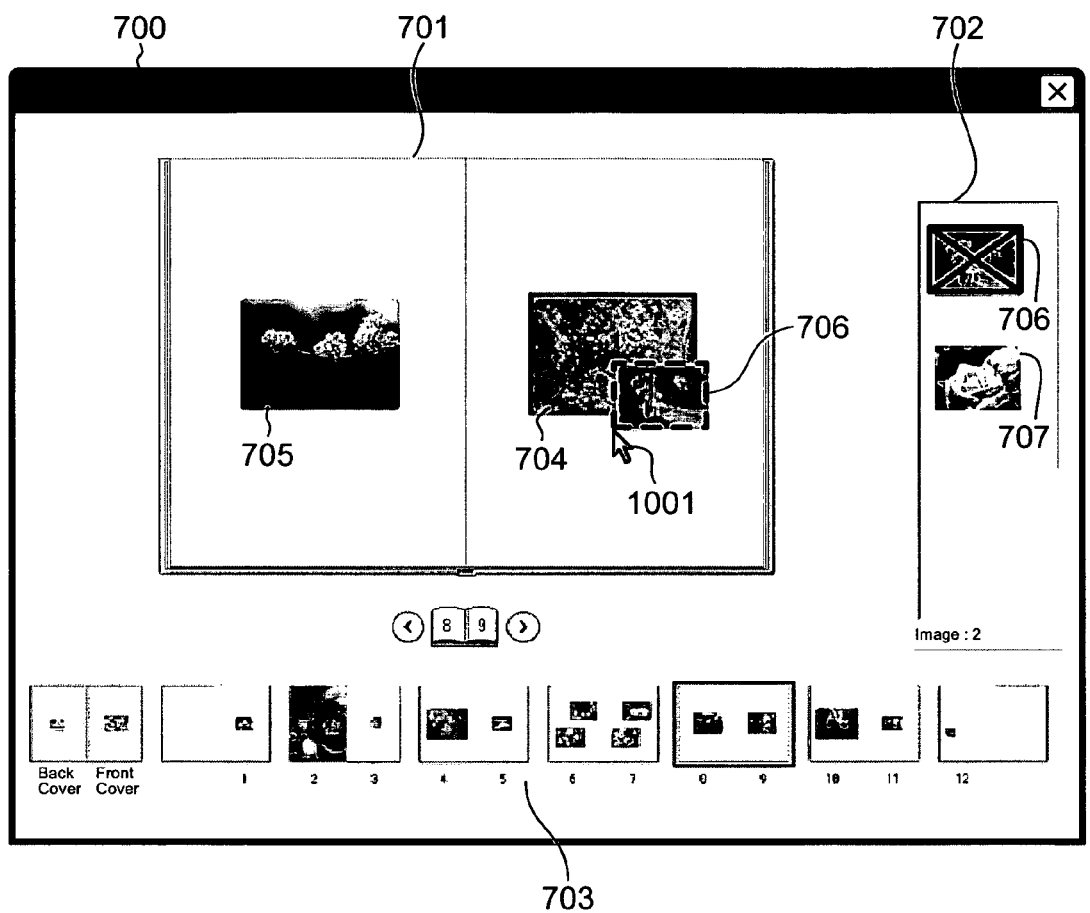
FIG. 10 shows an example of the edit screen displayed on the display of the computer apparatus.
Figure 11:
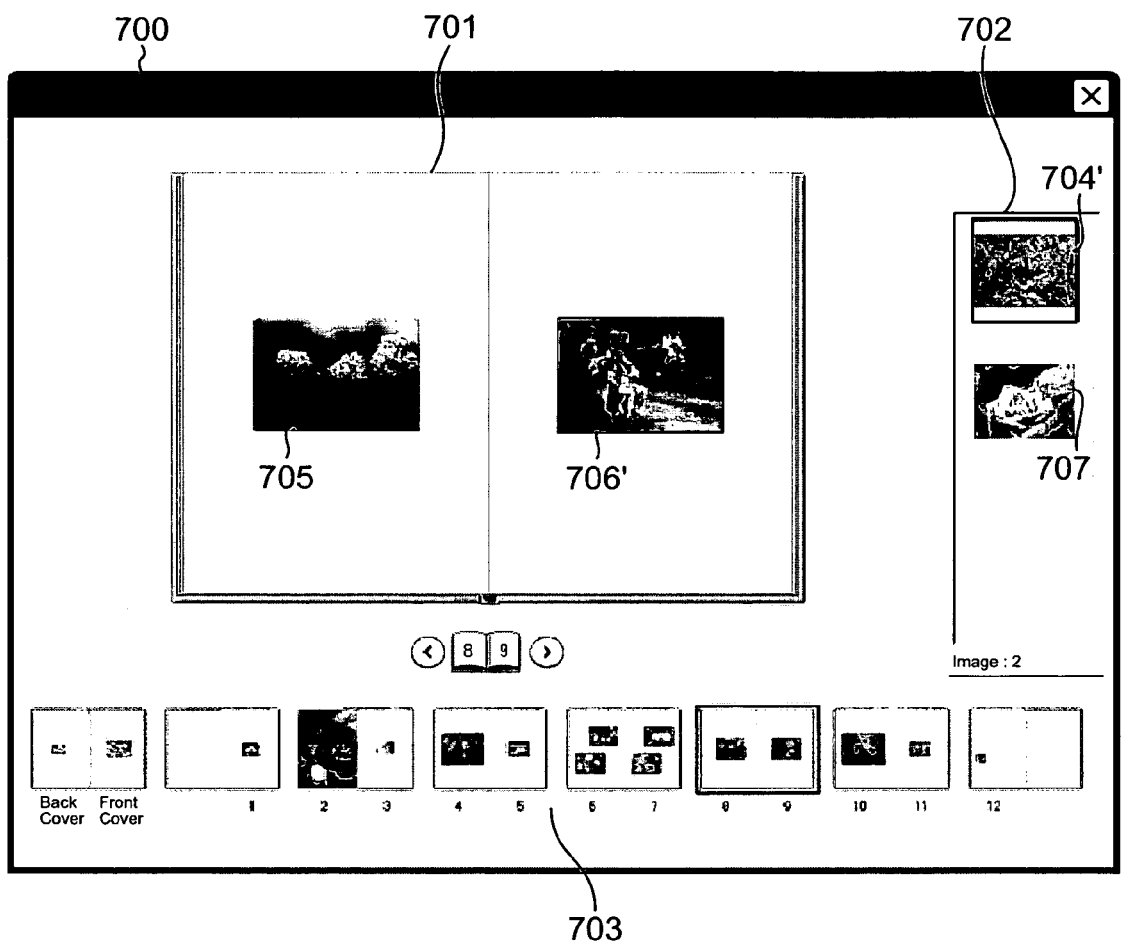
FIG. 11 shows an example of the edit screen displayed on the display of the computer apparatus.

On the other hand, as shown in FIG. 10, when the overlapping area between the dragged thumbnail image 706 and the high-resolution image 704 in the edit area 701 is equal to or larger than the predetermined value, the frame of the high-resolution image 704 is emphasized. Then, when the thumbnail image 706 is dropped at this position, the high-resolution image 706' corresponding to the thumbnail image 706 is laid out and displayed at the position where the high-resolution image 704 was displayed, as shown in FIG. 11. At the same time, a thumbnail image 704' corresponding to the high-resolution image 704 is displayed in the object selecting area 702.

Figure 12:
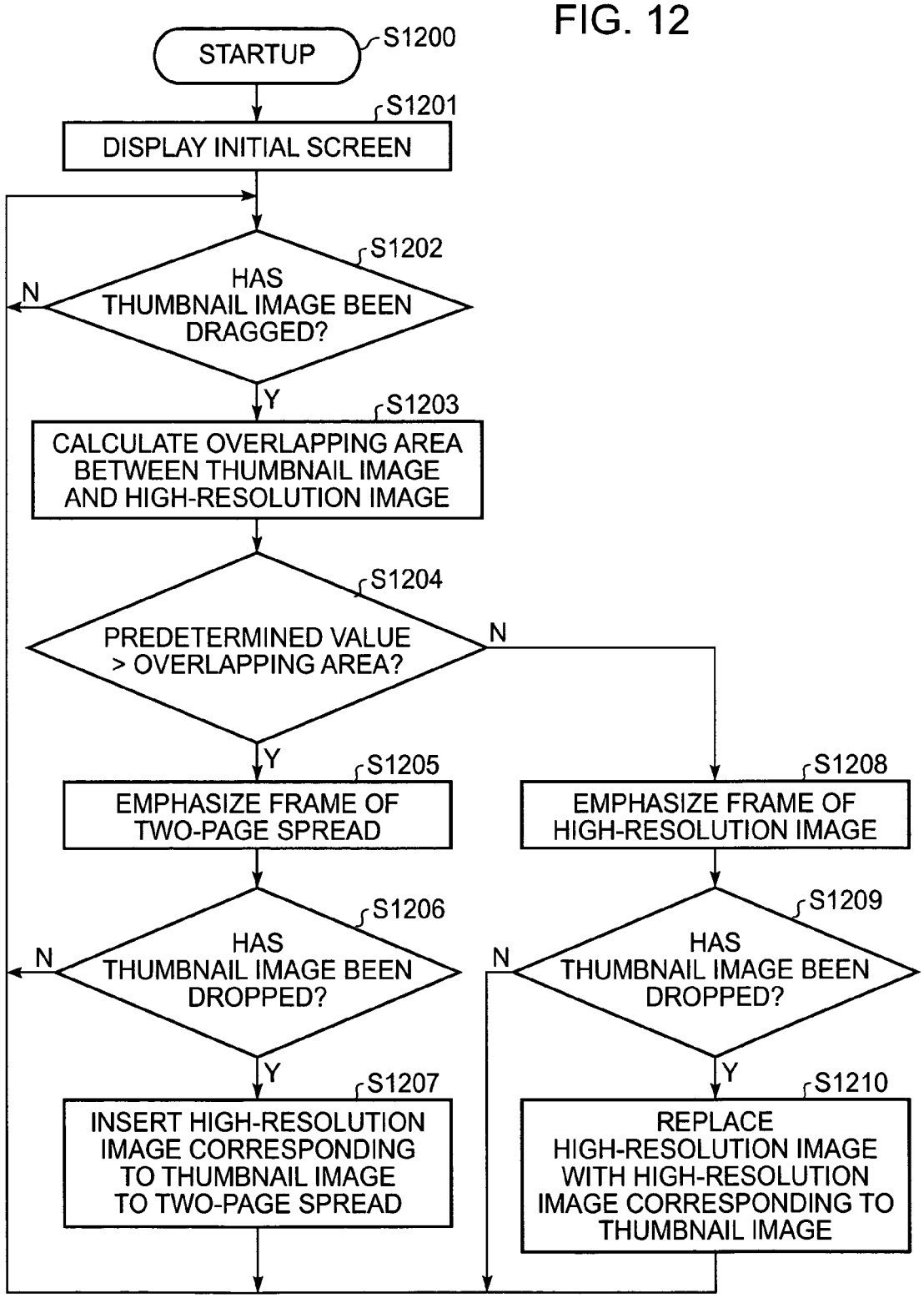
FIG. 12 is a flowchart showing an example of a procedure of a process executed by the computer apparatus in accordance with the application software.

Next, a procedure of a process executed by the CPU 106 of the computer apparatus 100 in accordance with the application software of this embodiment is described with reference to the flowchart shown in FIG. 12.

In step S1200, the CPU 106 starts the application software. Herein, assume that the CPU 106 has read high-resolution images from the HDD 109 and has laid out the images on the pages of the electronic album in response to the instructions of the application software.

In step S1201, the CPU 106 displays the edit screen shown in FIG. 7.

In step S1202, the CPU 106 determines whether a thumbnail image in the object selecting area 702 is dragged. Also, the CPU 106 detects the dragged thumbnail image and a display area thereof. Since each thumbnail image has a predetermined size, the display area of the thumbnail image can be detected based on a position indicated by the pointing device. In FIG. 8, a position indicated by the pointing device is indicated with a pointer 801, and the position of the pointer corresponds to a lower left corner of the thumbnail image. Specifically, assuming that the predetermined size of the thumbnail image has a width "w" and a height "h" and that coordinates of the position indicated by the pointing device are (Px, Py), the thumbnail image has lower-left coordinates (Px, Py) and upper right coordinates (Px+w, Py+h).

If it is determined in step S1202 that a thumbnail image in the object selecting area 702 is dragged, in step S1203, the CPU 106 calculates an overlapping area between the dragged and dropped thumbnail image 706 and the high-resolution image 704 in the edit area 701. Specifically, coordinates of the high-resolution image 704 that is already displayed in the edit area 701 are held in the RAM 108. The origin point of the coordinate system is at a lower left corner of the edit area 701. The RAM 108 holds coordinates of diagonal corners of each high-resolution image. For example, lower-left coordinates of the high-resolution image 704 are (Ix, Iy) and upper-right coordinates thereof are (Jx, Jy). Lower-left coordinates of the high-resolution image 705 are (Kx, Ky) and upper-right coordinates thereof are (Lx, Ly).

Then, if the Y coordinate of the lower-left corner of the dragged and dropped thumbnail image 706 is smaller than the Y coordinate of the upper-right corner of the high-resolution image 704 (Py<Jy) and if the Y coordinate of the upper-right corner of the thumbnail image 706 is larger than the Y coordinate of the upper-right corner of the high-resolution image 704 ((Py+h)>Jy), the CPU 106 calculates and obtains a height of the overlapping area, that is, a difference between the Y coordinate of the lower-left corner of the thumbnail image 706 and the Y coordinate of the upper-right corner of the high-resolution image 704 (=|Py−Jy|). On the other hand, if the Y coordinate of the lower-left corner of the thumbnail image 706 is equal to or smaller than the Y coordinate of the upper-right corner of the high-resolution image 704 (Py£Jy), if the Y coordinate of the lower-left corner of the thumbnail image 706 is equal to or larger than the Y coordinate of the lower-left corner of the high-resolution image 704 (Py³Iy), and if the Y coordinate of the upper-right corner of the thumbnail image 706 is equal to or lower than the Y coordinate of the upper-right corner of the high-resolution image 704 ((Py+h)£Jy), the CPU 106 obtains a height of the overlapping area, that is, the height "h" of the predetermined size of the thumbnail image 706. If the Y coordinate of the lower-left corner of the thumbnail image 706 is smaller than the Y coordinate of the lower-left corner of the high-resolution image 704 (Py<Iy) and if the Y coordinate of the upper-right corner of the thumbnail image 706 is larger than the Y coordinate of the lower-left corner of the high-resolution image 704 ((Py+h) >Iy), the CPU 106 calculates and obtains a height of the overlapping area, that is, a difference between the Y coordinate of the upper-right corner of the thumbnail image 706 and the Y coordinate of the lower-left corner of the high-resolution image 704 (=|(Py+h)−Iy|).

The CPU 106 also obtains a width of the overlapping area in the same way and calculates the overlapping area based on the obtained height and width.

In step S1204, the CPU 106 determines whether the overlapping area calculated in step S1203 is larger than a predetermined value. If the overlapping area is smaller than the predetermined value, the process proceeds to step S1205. If the overlapping area is equal to or larger than the predetermined value, the process proceeds to step S1208. The predetermined value is set as a default in the application software, but the user may change the setting of the predetermined value.

In step S1205, the CPU 106 creates image data in which the edit area 701 is emphasized in the VRAM 102 and displays the image data on the edit screen 700. Herein, emphasis patterns are stored in advance in the RAM 108 while being associated with overlapping areas. For example, setting is done so that the frame of the high-resolution image is displayed in red if the overlapping area is equal to or larger than the predetermined value and that the frame of the edit area 701 is displayed in blue if the overlapping area is smaller than the predetermined value.

In step S1206, the CPU 106 determines whether the thumbnail image 706 has been dropped. If the thumbnail image has not been dropped, the process returns to step S1202. If the thumbnail image 706 has been dropped, the process proceeds to step S1207. Herein, types of process to be executed are stored in advance in the RAM 108 while being associated with the overlapping areas. For example, setting is done so that the already displayed high-resolution image is replaced by a high-resolution image corresponding to the dropped thumbnail image (replacement) if the overlapping area is equal to or larger than the predetermined value and that the high-resolution image corresponding to the dropped thumbnail image is additionally displayed in the edit area 701 (insertion) if the overlapping area is smaller than the predetermined value.

In step S1207, the CPU 106 reads the high-resolution image 706' corresponding to the thumbnail image 706 and the thumbnail image 704' corresponding to the high-resolution image 704 from the hard disk so as to create image data in the VRAM 102, and then additionally displays the high-resolution image 706' in the edit area 701 as shown in FIG. 9.

In step S1208, the CPU 106 creates image data in which the high-resolution image 704 is emphasized in the VRAM 102 and displays the image data in the edit area 701.

In step S1209, the CPU 106 determines whether the thumbnail image 706 has been dropped. If the thumbnail image 706 has not been dropped, the process returns to step S1202. If the thumbnail image 706 has been dropped, the process proceeds to step S1210.

In step S1210, the CPU 106 reads the high-resolution image 706' corresponding to the thumbnail image 706 and the thumbnail image 704' corresponding to the high-resolution image 704 from the hard disk so as to create image data in the VRAM 102. Then, as shown in FIG. 11, the CPU 106 displays the high-resolution image 706' at the position where the high-resolution image 704 was displayed in the edit area 701 and displays the thumbnail image 704' at the position where the thumbnail image 706 was displayed in the object selecting area 702.

According to this embodiment, since an emphasized area varies in accordance with the amount of overlapping area between an object indicated by the pointing device and an already displayed object, the user can clearly see a position where an operated object is dragged and dropped.

Also, according to this embodiment, in a case where a process to be executed on an object varies in accordance with the amount of overlapping area between a dropped object and an already displayed object, an emphasis pattern varies in accordance with the type of process, for example, the color of the emphasized area is changed or the area is blinked. Therefore, the user can clearly know a process that will be executed after the operated object is dropped.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-256112 filed Sep. 2, 2004 and Japanese Application No. 2005-203467 filed Jul. 12, 2005, which are hereby incorporated by reference herein in their entirety.

What is claimed is:

1. An image display apparatus comprising a computer hard drive with program instructions when executed by a processor to process and display a plurality of images on a digital page, the image display apparatus comprising:

a control unit adapted to execute one of a plurality of insert processes in accordance with a position on a digital page where an object is dropped, wherein the plurality of insert processes includes an image adding process executed by newly adding a first image corresponding to the object on the digital page, and a replacing process executed by replacing a second image already displayed on the digital page with the first image corresponding to the object; and a determination unit adapted to change a frame display pattern on the digital page while the object is being dragged on the digital page and before the object is dropped, the determination unit changing the display pattern for a frame of the digital page when the object is on a position that indicates execution of the image adding process and the display pattern for the frame of the second image when the object is on a position that indicates execution of the replacing process, wherein the determination unit changes at least one of color, width, shape, transparency and blinking, for the frame display pattern, wherein the determination unit determines the replacing process to be executed if an overlapped area that the object is overlapped with the second image is more than a predetermined amount, and changes the frame display pattern of the second image, and wherein the determination unit determines the image adding process to be executed if an overlapped area that the object is overlapped with the second image is less than a predetermined amount, and changes the frame display pattern of the digital page.

2. The image display apparatus according to claim 1, wherein the object is a thumbnail image corresponding to the first image.

3. An image display method for displaying a plurality of images on a digital page of an image display apparatus, the image display method comprising:

executing one of a plurality of insert processes in accordance with a position on a digital page where an object is dropped, wherein the plurality of insert processes includes an image adding process executed by newly adding a first image corresponding to the object on the digital page, and a replacing process executed by replacing a second image already displayed on the digital page with the first image corresponding to the object; and changing a frame display pattern on the digital page while the object is being dragged on the digital page and before the object is dropped, the display pattern being changed for a frame of the digital page when the object is on a position that indicates execution of the image adding process and the display pattern for the frame of the second image when the object is on a position that indicates execution of the replacing process, wherein at least one of color, width, shape, transparency and blinking, for the frame display pattern, is changed, wherein if an overlapped area that the object is overlapped with the second image is more than a predetermined amount, the replacing process to be executed is determined and the frame display pattern of the second image is changed, and wherein if an overlapped area that the object is overlapped with the second image is less than a predetermined amount, the image adding process to be executed is determined, and the frame display pattern of the digital page is changed.

4. A computer-readable medium having computer-executable instructions stored thereon for an image display apparatus to perform an image display method for displaying a plurality of images on a digital page, the image display method comprising;

executing one of a plurality of insert processes in accordance with a position on a digital page where an object is dropped, wherein the plurality of insert processes includes an image adding process executed by newly adding a first image corresponding to the object on the digital page, and a replacing process executed by replacing a second image already displayed on the digital page with the first image corresponding to the object; and changing a frame display pattern on the digital page while the object is being dragged on the digital page and before the object is dropped, display pattern being changed for a frame of the digital page when the object is on a position that indicates execution of the image adding process and the display pattern for the frame of the second image when the object is on a position that indicates execution of the replacing process, wherein at least one of color, width, shape, transparency and blinking, for the frame display pattern, is changed, wherein if an overlapped area that the object is overlapped with the second image is more than a predetermined amount, the replacing process to be executed is determined and the frame display pattern of the second image is changed, and wherein if an overlapped area that the object is overlapped with the second image is less than a predetermined amount, the image adding process to be executed is determined, and the frame display pattern of the digital page is changed.

* * * * *